United States Patent [19]

Sugimori et al.

[11] Patent Number: 4,744,744
[45] Date of Patent: May 17, 1988

[54] EXTRUSION NOZZLE FOR COAGULATION OF POLYMER LATICES

[75] Inventors: Teruhiko Sugimori; Noriyuki Tajiri; Akio Hironaka; Hideaki Habara, all of Ohtake, Japan

[73] Assignee: Mitsubishi Rayon Co., Ltd., Tokyo, Japan

[21] Appl. No.: 592,365

[22] Filed: Mar. 22, 1984

[30] Foreign Application Priority Data

Mar. 22, 1983 [JP] Japan .................................. 58-47523
Mar. 23, 1983 [JP] Japan .................................. 58-48447

[51] Int. Cl.⁴ .............................................. B29C 47/30
[52] U.S. Cl. .................................. 425/464; 425/376 R
[58] Field of Search ............... 425/463, 461, 464, 462, 425/67-70, 133.1, 725; 264/4

[56] References Cited

U.S. PATENT DOCUMENTS

| | | | |
|---|---|---|---|
| 1,159,489 | 11/1915 | Gammel | 425/464 |
| 1,310,509 | 7/1919 | Specht | 425/464 |
| 1,874,503 | 8/1932 | Greenwood | 425/463 |
| 2,447,994 | 8/1948 | Wicker | 425/464 |
| 3,248,455 | 8/1966 | Hearsch | 528/499 |
| 3,295,162 | 1/1967 | Forceville | 425/70 |
| 3,341,645 | 9/1967 | Horiuchi et al. | 264/188 |
| 3,361,860 | 1/1968 | Fassbender | 264/188 |
| 3,412,191 | 11/1968 | Kitajima et al. | 264/180 |
| 3,465,618 | 9/1969 | McIntosh et al. | 425/464 |
| 3,849,044 | 11/1974 | Ando et al. | 425/463 |
| 3,913,421 | 10/1975 | Hawkins | 425/464 |
| 4,110,491 | 8/1978 | Secor | 427/212 |
| 4,167,386 | 9/1979 | Mallay | 425/463 |
| 4,248,577 | 2/1981 | Bory et al. | 425/464 |
| 4,327,050 | 4/1982 | Salmon | 425/464 |
| 4,370,114 | 1/1983 | Okamoto et al. | 425/463 |
| 4,429,114 | 1/1984 | Sugimoni et al. | 528/486 |

FOREIGN PATENT DOCUMENTS

| | | | |
|---|---|---|---|
| 652307 | 8/1964 | Belgium | 425/464 |
| 735778 | 6/1966 | Canada | 425/67 |
| 491242 | 2/1930 | Fed. Rep. of Germany | 425/464 |
| 682434 | 10/1939 | Fed. Rep. of Germany | 425/464 |
| 2222008 | 11/1972 | Fed. Rep. of Germany | 425/463 |
| 2542796 | 4/1976 | Fed. Rep. of Germany | . |
| 442630 | 6/1912 | France | 425/464 |
| 318464 | 9/1929 | United Kingdom | 425/464 |
| 881683 | 11/1961 | United Kingdom | 425/464 |

OTHER PUBLICATIONS

Ser. No. 197,564, 4-1943, Wempe (A Publication by the Alien Property Custodian).

*Primary Examiner*—Willard E. Hoag
*Attorney, Agent, or Firm*—Oblon, Fisher, Spivak, McClelland & Maier

[57] ABSTRACT

Apparatus for coagulation of a polymer latex by feeding the polymer latex to an extruder having a base plate and a plurality of fine tubes fixed to said base plate and extending therefrom, said fine tubes being mutually spaced by at least 1 mm and protruding from said base plate by at least 3 mm, and discharging said polymer latex through said fine tubes into coagulation solution to coagulate the latex and an extruder used for carrying out said method.

14 Claims, 6 Drawing Sheets

EXTRUSION NOZZLE FOR COAGULATION OF POLYMER LATICES

This invention relates to an extruder for the coagulation of polymer latices.

In the chemical industry, a large volume of coagulable substances such as, for example, polymer latices and rubber latices are dealt with. They are used partly as such in adhesives or coating compositions, but mostly after coagulation with a coagulant. Accordingly, the coagulation is one of the processes of a high rank in the related fields. Nevertheless, the method and apparatus employed in the current practice are those based on an obsolescent technology originated in old-time experiences.

In the field of resin industry, it is a common practice to produce a powdered dry polymer from a polymer latex formed by emulsion polymerization by bringing the latex into contact with a coagulant comprising an acid or an inorganic polyvalent salt, thereby to effect coagulation, then solidifying the polymer by heat treatment or other means followed by dehydration and drying. The powdered polymer produced by the generally adopted method is, however, irregular in the shape of particles and has a particle size distribution in a wide range from coarse particles on one hand to finely divided particles on the other. As a consequence, such a powdered polymer gives rise to undesirable problems such as a decrease in yield or an environmental pollution due to the scattering of fine particles; a phenomenon of clogging in the piping at the outlet of a reservoir or in other parts of the equipment due to the low flowability of the powder; a deterioration of the working environment and an increased possibility of dust explosion due to the evolution of fine dust. Moreover, low bulk density of the powdered polymer causes not only a decrease in the efficiency of a dehydrator, resulting in an increase in the cost of transportation or storage, but also an increased consumption of heat energy in the drying step.

In recent years, there have been published a number of attempts to improve the powder characteristics of a powdered polymer in view of the importance of coagulation procedure. In one of the directions of such research and development, there are proposals of some improvement in conventional methods or apparatuses for the coagulation, while in another direction there are proposals of spray drying or gas-phase coagulation utilizing a gas-phase reaction. These proposals, however, have not yet afforded a decisive improvement, because the product is still unsatisfactory in powder properties or an increase in energy or installment cost is unavoidable.

Under the circumstances, the present inventors have already applied patents based on the invention of a method for producing a particulate material of high bulk density containing substantially neither fine particles nor coarse particles by discharging an emulsion latex into a coagulation solution through the fine tubes which meet the specified requirements [U.S. patent application Ser. No. 378,331, now U.S. Pat. No. 4,429,114].

Starting from the above invention, the present inventors advanced further their extensive study and, as a result, found that it is possible to obtain a particulate polymer material excellent in powder characteristics by using an extruder (a nozzle assembly) comprising a base plate provided with a plurality of fine tubes mutually spaced by a specified interval and having a specified tube length as a nozzle assembly for the coagulation of a polymer latex.

The present invention provides a method for the coagulation of a polymer latex, said method comprising the steps of: feeding polymer latex to an extruder (a nozzle assembly) having a base plate, and a plurality of fine tubes fixed to said base plate and extending therefrom, said fine tubes being mutually spaced by at least 1 mm and protruding from said base plate by at least 3 mm; extruding, discharging or projecting said polymer latex through said fine tubes; and coagulating said extruded, discharged or projected polymer latex.

In this invention, a nozzle assembly having such specific structure is called "extruder".

The structure of one of the representative examples of the extruder used in this invention is described below.

BRIEF DESCRIPTION OF THE DRAWINGS

FIGS. 2 and 4 are end views of the nozzle of the invention.

FIG. 3 is a longitudinal cross-section through the nozzle.

FIGS. 5 and 7 are longitudinal cross-sections of the embodiments of the invention with a different clamp than FIG. 1.

FIG. 6 is an end view of the nozzle of FIG. 7.

FIG. 8 is an end view of still another embodiment of the invention,

FIG. 9 is a longitudinal cross-section of the nozzle of FIG. 8.

FIG. 10 is a view of a rectangular nozzle assembly in partial perspective and partially in section.

FIG. 11 is a view of another embodiment, partly in perspective and partly in longitudinal section.

FIG. 1 is a side view (third angle projection) of the section along the line I—I of FIG. 2 (front view) and shows the structure of the case where the fine tubes are inserted into the base plate to a depth corresponding to the plate thickness and the base plate is separable from the holder which seves as a polymer latex chamber. In FIGS. 1 and 2, 1 is a fine tube, 2 a base plate, 3 a holder which serves as a polymer latex chamber, 4 a gasket, 5 a clamp, and 6 an adhesive. FIG. 3 shows another structure wherein the base plate is positioned at the middle part of fine tubes and both the base plate and the holder are integrally molded as one piece so that the base plate may become an integral part of the holder. In FIG. 3, 1 is a fine tube and 2 a base plate.

Figure 1:
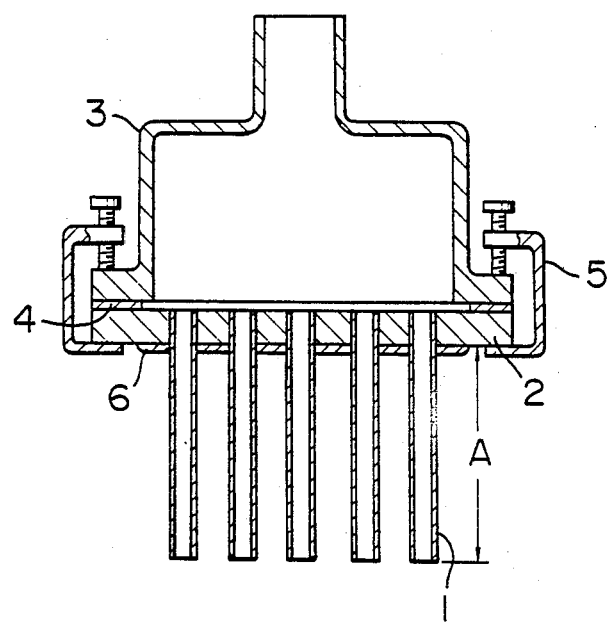
FIGS. 1–11 show embodiments of the apparatuses used in this invention.
Figure 2:
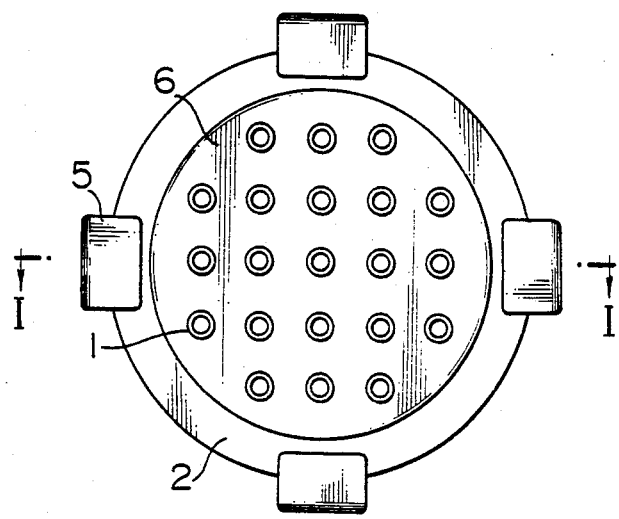
Figure 3:
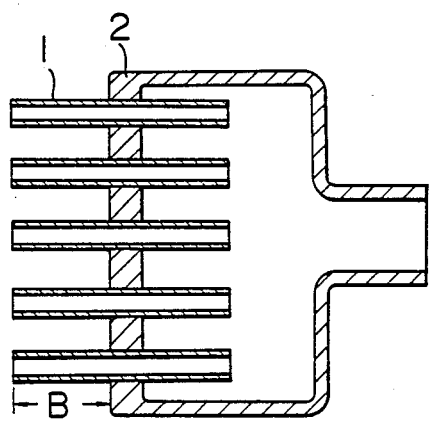

The structure of extruder used in this invention is not limited to those shown in FIGS. 1 to 3. Substantially any structure may be adopted so long as a plurality of fine tubes are provided in the base plate in such a manner that the interval between adjacent fine tubes is 1 mm or more and the tube length of protrusion from the base plate (i.e. A in FIG. 1 or B in FIG. 2) is 3 mm or more.

As is apparent from FIGS. 1 to 3 of representative examples, the structure of the extruder having the fine tubes has an appearance characteristic of a "Kenzan" generally used in flower arrangement. Owing to the Kenzan-like structure, the contact between the coagulable substance and the coagulation solution becomes improved, the coagulable substance extruded, i.e. discharged or projected from the extruder is coagulated in a characteristic form, and a particulate polymer material excellent in powder characteristics is produced. A polymer latex, i.e. coagulable substance, is discharged from the holder (polymer latex chamber) through fine tubes into a coagulation solution, while the direction of the fine tubes and the flow rate of the coagulation solution is adjusted so that the coagulation solution may flow undisturbed in the same direction as that of the discharged polymer latex. The holder or protruded fine tubes interfere with the flow of coagulation solution to cause turbulence in the flow and the turbulence gives rise to eddies around the protruded fine tubes in the downstream side. When the fine tubes are protruded from the base plate by 3 mm or more, preferably 10 mm or more, the distal end of each fine tube is in the zone of laminar flow outside the eddies and the polymer latex discharged from each distal end flows without disturbance carried by the laminar flow of coagulation solution while the coagulation reaction taking place, resulting in a particulate polymer material of high bulk density in characteristic form containing substantially neither fine particles nor coarse particles. Although subject to no special limitation, the maximum length of protrusion of fine tubes from the base plate is approximately 200 mm from the standpoint of industrial productivity.

On the other hand, if the interval between adjacent fine tubes is narrower than 1 mm, the coagulation solution to enter the clearance among the fine tubes and the coagulation of polymer latex becomes difficult except at the outlying zone of the group of fine tubes. When the interval is below 1 mm, even if the coagulation solution is forced into the clearance by some means, the threads coagulable substance discharged from fine tubes tend to merge with one another owing to the fluctuation of the jet stream brought about by the coagulable substance, resulting in massive particles which hinder the production of a particulate material of desirable powder characteristics. It is necessary, therefore, that the clearance between adjacent fine tubes be 1 mm or more, preferably 3 mm or more. In view of the rate of production of a particulate polymer material, the interval should be up to about 20 mm, preferably up to about 10 mm.

Examples of other embodiments of extruder for use in the coagulation of polymer latex according to this invention are described below.

As the first example, mention may be made of an extruder in which each surface of the base plate is divided into at least two sections, zones or regions, which are mutually spaced by an interval of at least 5 mm, and the fine tubes extend from the base plate only at said sections, the interval between adjacent fine tubes being 1 mm or more and the tube length of protrusion from the base plate being 5 mm or more. An example is described below with reference to the drawings.

Figure 4:
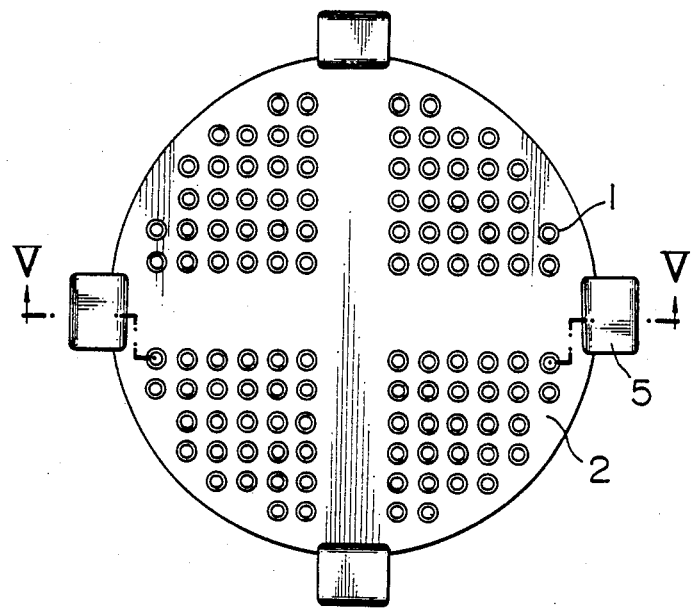
Figure 5:
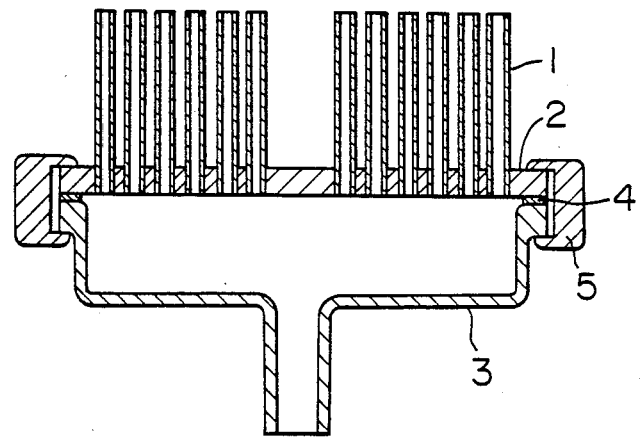

FIGS. 4 and 5 represent an example in which both surfaces of the base plate are each divided into 4 sections, zones or regions mutually spaced by 5 mm or more and the fine tubes are inserted to the depth corresponding to the plate thickness, the base plate being separable from the holder. FIG. 4 is a front view (third angle projection) and FIG. 5 is a side view of the section along the line V—V of FIG. 4. In FIGS. 4 and 5, 1 is a fine tube, 2 a base plate, 3 a holder which serves as a polymer latex chamber, 4 a gasket, and 5 a clamp. Each fine tube 1 passes through the base plate 2, both the fine tube 1 and the base plate 2 being bonded together either directly or by means of an adhesive or the like. The holder 3 and the base plate 2 are tightly clamped together with a gasket 4 placed therebetween so as to keep the coagulable substance such as polymer latex in the polymer latex chamber from leaking through the jointed part between the base plate and the holder.

A problem arising from the scale-up of a nozzle assembly comprising a plurality of fine tubes is a steady supply of the coagulation solution to the central part of a group of fine tubes, because otherwise a smooth coagulation is difficult to proceed. When use is made of an extruder in which the group of fine tubes are divided into two or more sections, zones or regions apart from one another by 5 mm or more as described above, the coagulation solution passes smoothly, even without being forced, through the clearance between each section and enters the central part of a group of the fine tube assembly as well as the outer zone adjacent to the central zone of the fine tube assembly, resulting in thorough contact with the coagulable substance discharged from the fine tubes to effect satisfactory coagulation. In view of industrial productivity, the interval between the adjacent sections on the base plate is about 100 mm at maximum.

As the second example of another embodiment, there may be mentioned a structure of extruder which permits the supply of coagulation solution through the central part of the base plate which carries a plurality of fine tubes apart from one another by 1 mm or more and protruding from the base plate by 3 mm or more. An example is described below with reference to the drawings.

Figure 6:
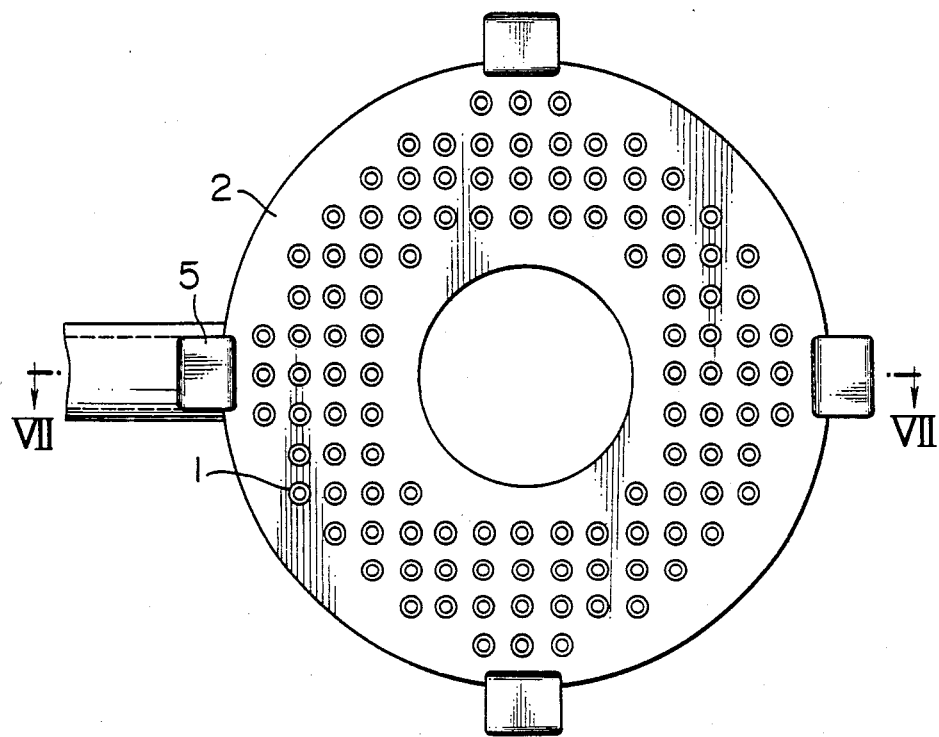
Figure 7:
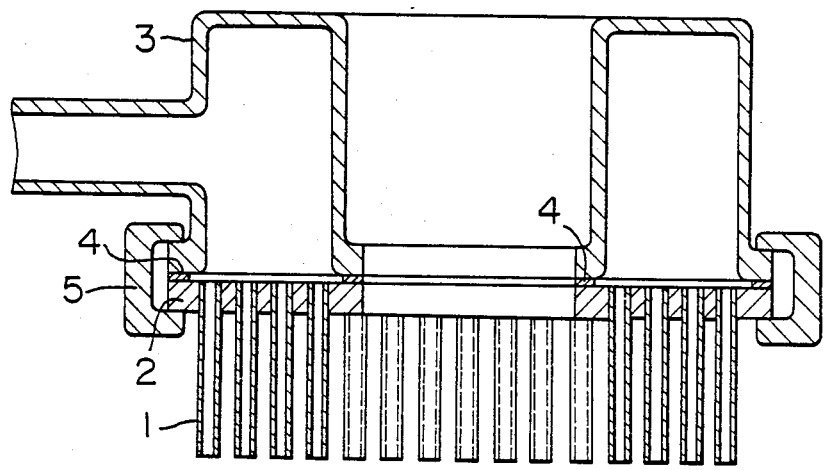
Figure 8:
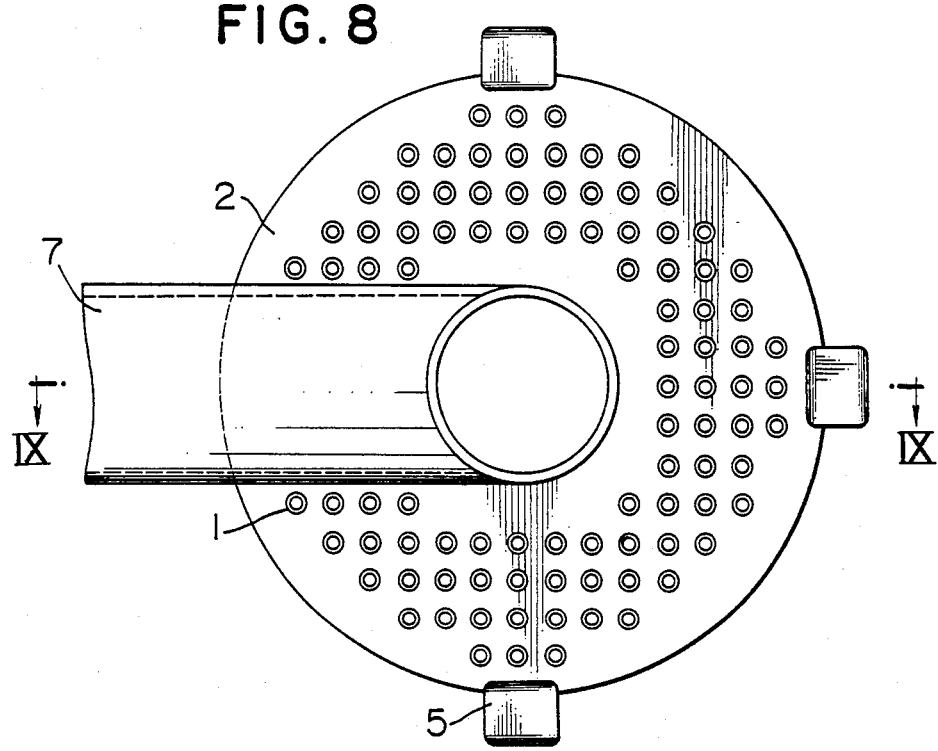
Figure 9:
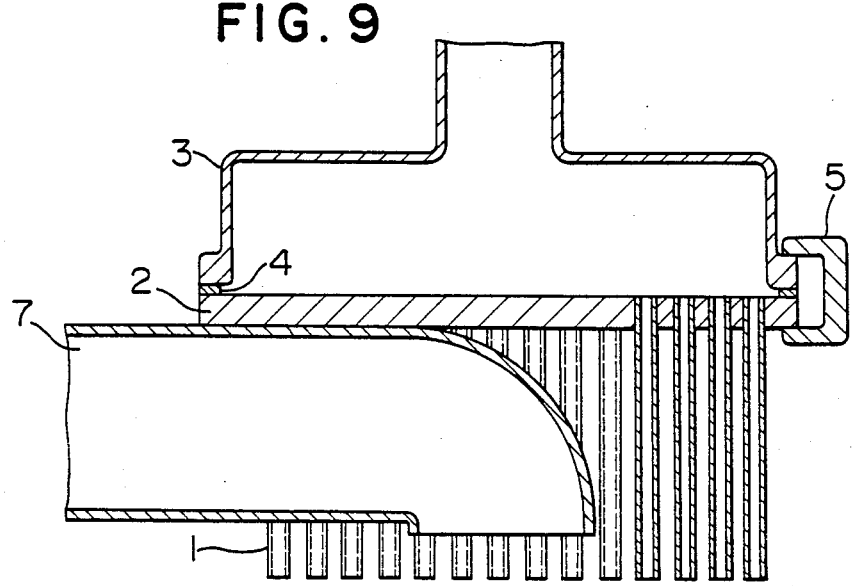

FIG. 6 is a front view (third angle projection) of an extruder in which the base plate has a circular through-hole in the central part and shows an appearance of annular plate of the doughnut type, the fine tubes being inserted to a depth corresponding to the plate thickness. FIG. 7 is a side view of the section along the line VII—VII of FIG. 6. Such a structure permits the coagulation solution to flow in the direction from the back side (holder side) to the front side (fine tube extending side) of extruder through the central hole as well as along the peripheral zone of the extruder. FIG. 8 is a front view (third angle projection) of an extruder in which there is provided a separate conduit for supplying the coagulation solution to the central part of the extruder, the fine tubes being inserted into the base plate to a depth corresponding to the plate thickness. FIG. 9 is a side view of the section along the line IX—IX of FIG. 8. In such a structure, the coagulation solution can be supplied at any flow rate. In FIGS. 6 to 9, 1 is a fine tube, 2 a base plate, 3 a holder, 4 a gasket, and 5 a clamp. In FIGS. 8 and 9, 7 is a conduit for the forced supply of coagulation solution at any flow rate.

As an example of a further embodiment, mention may be made of an extruder in which a base plate having a minor axis not exceeding 150 mm is provided with a plurality of fine tubes apart from one another by 1 mm or more and protruding from the base plate by 3 mm or more. An example is described below with reference to the drawings.

Figure 10:
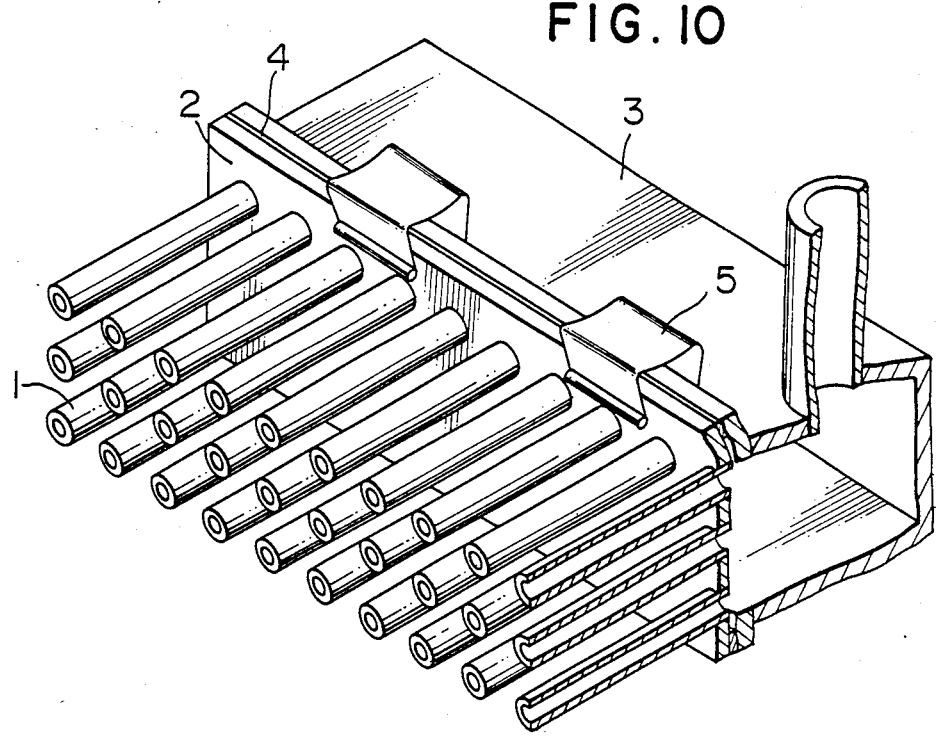

FIG. 10 is an oblique view of the partially exploded extruder, i.e. nozzle assembly. In FIG. 10, 1 is a fine tube, 2 a base plate, 3 a holder, 4 a gasket, and 5 a clamp. The fine tube 1 or a hole connecting thereto passes through the base plate 2. The structural types of the extruder shown above include not only that shown in FIG. 10, wherein the base plate is rectangular, but also other extruders of any shape in base plate so long as the latter has a minor axis not exceeding 150 mm and provided with a plurality of fine tubes. When an extruder of such a special type is used, since the coagulation solution flows in the direction of minor axis toward the direction of central axis of the extruder and, in addition, the path of flow is short, the coagulation solution can be brought into satisfactory contact with the coagulable substance discharged from the fine tubes to coagulate the latter in thread form, whereby a particulate material of excellent powder characteristics is produced. Moreover, the above type of extruder has no limit in the length in major-axial direction and, accordingly, a great number of fine tubes can be provided in one unit of extruder to afford an industrial advantage. The above type of extruder can be installed in such a manner that the major axis may be in either a horizontal plane or a vertical plane. Especially in the latter case, there is an advantage in that a large number of extruders can be installed in the horizontal direction and, accordingly, a large number of fine tubes can be installed in unit floor area.

The examples described in the foregoing are typical of those of the embodiments of extruder suitable for use in the method according to this invention.

Among other embodiments, mention may be made of a structure which makes it possible to discharge a polymer latex from the fine tubes disposed on a base plate and to supply a coagulation solution from the annular orifices surrounding said fine tubes. A typical example is described below with reference to FIG. 11.

Figure 11:
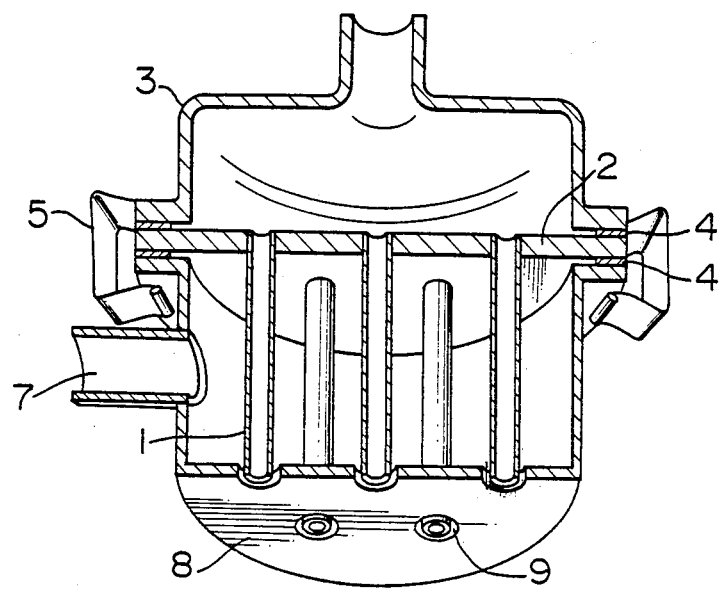

FIG. 11 is an oblique sectional view of an example of the nozzle assembly or extruder, wherein 1 is a fine tube, 2 a base plate, 3 a holder, 4 a gasket, 5 a clamp, 7 a coagulation solution inlet pipe, 8 a coagulation solution feeder or chamber provided at the front side (fine tube extending side) of the base plate, and 9 a coagulation solution outlet. The feeder 8 includes a plate having openings surrounding distal ends of the tubes 1. In such a type of nozzle assembly or extruder, the fine tubes and the base plate should be tightly bonded together either directly or by means of an adhesive so as to keep the coagulable substance from leaking. The base plate and the holder should be in tight contact with a gasket placed therebetween to keep the coagulable substance from leaking. Likewise, the base plate and the coagulation solution feeder or chamber should be tightly jointed together to keep the coagulation solution from leaking. The coagulation solution feeder or chamber and the coagulation solution inlet pipe should be tightly bonded together in a customary manner preferably by welding, adhesive bonding, screw jointing, or a one-piece molding.

Such an extruder for use in the coagulation of latex has the following advantageous features:

1. A coagulable substance such as a polymer latex can be discharged from fine tubes.

2. A coagulation solution can be supplied from the annular orifices surrounding the fine tubes. An outstanding feature of this type of extruder is to effect coagulation by supplying the coagulation solution to the front side of the base plate (fine tube extending side) so as to entrap the coagulable substance discharged from the fine tubes. The fine tubes can be freely arranged, because the progress of coagulation is hardly affected by the flow of water or the coagulation solution in the surroundings of the extruder and there is no danger of the formation of coarse aggregates by mutual merging of the discharged fine streams of coagulable substance due to the effect of eddy currents.

The structure of the above extruder is not limited to that shown in FIG. 11 wherein the distal end of each fine tube is in the same plane as that of the coagulation solution outlet. The fine tube can be either protruded further from the coagulation solution feeder or chamber or positioned nearer to the base plate than the coagulation solution outlet. It is necessary, however, that the distal end of each fine tube be within the zone where the coagulation solution flows in the direction of the axis of fine tubes, said zone being adjustable to some extent by adjusting the shape of coagulation solution feeder or chamber, the shape of the coagulation solution outlet, or the feeding rate of coagulation solution.

It is not desirable to use the above extruder, as shown in FIG. 11, in the air. Such an extruder should be installed in still or gently flowing water or in still or gently flowing coagulation solution. The coagulable substance is fed to the holder (polymer latex chamber) and discharged from the fine tubes; at the same time, the coagulation solution is delivered through the outlet of the coagulation solution feeder or chamber so as to surround the fine tubes. It is thus possible to produce a powder excellent in powder characteristics.

The size of the above extruder can be freely selected, because each stream of the coagulable substance discharged from each fine tube coagulates in each stream of coagulation solution to produce a coagulum in the form of string-like aggregation. As a consequence, the number of fine tubes provided in one extruder unit is limitless.

When a coagulable substance is discharged through fine tubes into a coagulation solution to produce aggregations in string-like form which are then cut into pieces by stirring or other means to produce a particulate material in granular form of excellent powder characteristics, an important factor is the relative velocity of the flow of coagulation solution to that of coagulable substance. If both velocities are equal, the discharged coagulable substance coagulates in the form as discharged without being subjected to external disturbance. When the flow rate of the coagulable substance is larger to some extent than that of the coagulation solution, the discharged coagulable substance coagulates in the form of a string of beads (rosary) due to the phenomenon of fluctuation which occurs immediately after discharge. When the flow rate of the coagulable substance is further increased, the stress generated at the interface between the jet stream of discharged coagulable substance and the coagulation solution becomes large enough to exceed the mechanical strength of half-coagulated coagulable substance, resulting in finely divided powder in place of desirable granules. In general, in order to improve the productivity of the extruder by increasing the rate of discharge of the coagulable substance, it is necessary to increase also the flow rate of coagulation solution. If an extruder having no feeder for the coagulation solution is used, with the increase in flow rate of coagulation solution near the fine tubes, the eddy zone in the downstream becomes enlarged and, hence, it becomes necessary to prolong the fine tubes so that the coagulable substance may be discharged into the zone of laminar flow beyond the eddy zone in a downstream direction. Prolonged fine tubes are undesirable from the view point of fabrication and handling. When an extruder shown in FIG. 11 is used, the increase in flow rate of coagulation solution relative to that of the discharged coagulable substance may be attained by simply increasing the rate of supply of coagulation solution to the feeder. Accordingly, the extrusion rate of the coagulable substance can also be increased to gain an industrial advantage. Moreover, since the fine tubes of the extruder of FIG. 11 are protected from external mechanical force by the coagulation solution feeder, their handling is easy. Therefore, the most industrially advantageous extruder has a structure which enables the coagulation solution to deliver so as to surround the fine tubes which discharge a coagulable substance.

As the materials suitable for the base plate used in constructing the extruder in practicing the present invention, mention may be made of various glasses, inorganic sintered materials; synthetic resins such as polymethyl methacrylate, polyvinyl chloride, polyamides, polyesters, polycarbonate, polypropylene, polyethylene, ABS resin, polyacetal, acrylonitrile-styrene copolymer and fluorocarbon resins; metals such as stainless steel, copper, platinum, gold, and lead. Other materials chemically resistant to the coagulation solution and coagulable substance may also be used. The base plate may be in any form such as circular, square, rectangular, elliptic, etc.

The fine tubes used in constructing the extruder are those described and specified in U.S. patent application Ser. No. 378,331, now U.S. Pat. No. 4,429,114. The disclosure of the specification of this patent is incorporated herein by reference. Although subject to no special limitation, the inner diameter of fine tube is preferably 3 mm or below and the outer diameter is preferably 5 mm or below.

As the materials for fine tubes, use may be made of the same materials as mentioned above regarding the base plate and other materials chemically resistant to coagulation solutions and coagulable substances.

The fine tube and the base plate should be firmly jointed. The jointing may be performed by adhesive jointing, direct jointing, one-piece molding, and screw jointing. In the extruder shown in FIG. 1, the base plate and the fine tube are bonded together by means of an adhesive. As adhesives, use may be made of any of those which are chemically resistant to the coagulation solutions and polymer latices and capable of bonding fine tubes to the base plate. Examples of useful adhesives include epoxy-base adhesives, rubber-base adhesives, and hot-melt adhesives. Direct bonding of fine tubes to the base plate may be performed by pouring a polymerizable substance, which forms the base plate, into a mold in which the fine tubes have been fixedly placed and allowing the polymerization to take place or by pouring a molten substance, which forms the base plate, into a mold in which the fine tubes have been fixedly placed and allowing the molten substance to solidify by cooling. The one-piece molding is performed by injection molding of synthetic resins or by metal casting. The screw joints may be prepared by screwing the fine tube threaded in male type into a hole threaded in female type provided in the base plate.

The holder 3 shown in FIGS. 1 to 11 serves to distribute the polymer latex, supplied from a pipe, to each fine tube and is generally in funnel shape though those in other forms, as shown above, may be used. The materials of holder may be the same as those used in the base plate. The holder and the base plate are generally separable to facilitate the maintenance work, though other types may be used as shown in FIG. 3 where the extruder is made by one-piece molding. In separable types shown in Figs. except for FIG. 3, the base plate and the holder are clamped together with a sealing material such as a gasket placed therebetween. As the gasket, use may be made of a rubber sheet, a polytetrafluoroethylene sheet, or an O-ring. The clamping tools include customary ones such as bolt-and-nut, vise, and clamping ring. The materials for the clamping tools may be the same as those used in the base plate.

As the polymer latices, use may be made of most polymer latices which are produced by the emulsion polymerization and are recoverable. The polymer latices effectively used in the present invention include those produced by the emulsion polymerization of ethylenic monomers, rubber-like polymer latices, those produced by the graft polymerization of an ethylenic monomer onto the rubber-like polymer, those produced by graft polymerization of a rubber-producing monomer onto a polymer of an ethylenic monomer and mixtures of these latices.

As ethylenic monomers, mention may be made of styrenic monomers such as styrene, α-methylstyrene, o-ethylstyrene, o-chlorostyrene, p-chlorostyrene, divinylbenzene; acrylonitrile-type monomers such as acrylonitrile, methacrylonitrile and vinylidene cyanide; acrylic acids; esters of acrylic acids such as methyl acrylate and ethyl acrylate; methacrylic acids; esters of methacrylic acids such as methyl methacrylate and ethyl methacrylate; vinyl esters such as vinyl acetate; vinylidene halides such as vinylidene chloride; vinyl halides such as vinyl chloride; vinyl ketone, acrylamide, and maleic anhydride. These monomers are used each alone or in mixtures.

As rubber-like polymers, mention may be made of natural or synthetic rubber-like polymers such as natural rubber, butadiene rubber, styrene-butadiene copolymer, acrylonitrile-butadiene copolymer, isoprene rubber, chloroprene rubber, acrylic rubbers, and ethylenevinyl acetate copolymer.

All of the acids and water-soluble inorganic salts generally used as coagulants for polymer latices can also be used in the present method. Such acids include mineral acids such as sulfuric acid, hydrochloric acid, and the like, and organic acids having a dissociation constant of $10^{-6}$ mole/liter or above such as acetic acid, benzoic acid, salicylic acid, formic acid, and tartaric acid. Suitable salts are sulfates (magnesium sulfate, sodium sulfate, and the like), chlorides, acetates, and the like, and mixtures thereof.

The polymer latices may contain known additives such as dispersants, lubricants, thickeners, surface active agents, plasticizers, antioxidants, colorants and foaming agents. The dimensional stability of the secondary particles formed by coagulation is sometimes affected to a great extent especially by the presence of dispersants. Those inorganic and organic dispersants which are generally used as stabilizers in emulsion polymerization and suspension polymerization can also be used in the present method. Suitable inorganic dispersants include magnesium carbonate and tricalcium phosphate. As natural and synthetic polymer dispersants among organic dispersants, mention may be made of starch, gelatine, acrylamide, partially saponified polyvinyl alcohol, partially saponified polymethyl methacrylate, polyacrylic acid and salts thereof, cellulose, methylcellulose, polyalkylene oxide, polyvinylpyrrolidone, polyvinylimidazole, and sulfonated polystyrene. Low molecular weight dispersants commonly used as emulsifiers such as, for example, alkylbenzenesulfonates and fatty acid salts can also be used. The addition of thickeners such as starch syrup, paraffin and the like facilitates the formation of secondary particles and also makes it possible to control the geometry of particles.

In practicing the present invention, the extruder, i.e. nozzle assembly, having the structure as described above is immersed in a coagulation bath and a polymer latex fed to the polymer latex chamber, i.e. holder, is discharged or extruded through the fine tubes into the coagulation bath to produce effectively a particulate polymer material of high bulk density which has characteristic appearance and contains neither finely divided particles nor coarse particles.

The invention is illustrated below in detail with reference to Examples. In Examples and Comparative Examples, all parts and percents are by weight and the following abbreviations are used:
AN: Acrylonitrile
BA: Butyl acrylate
BD: Butadiene
EA: Ethyl acrylate
MMA: Methyl methacrylate
ST: Styrene
PC: Polycarbonate
PMMA: Polymethyl methacrylate
PVC: Polyvinyl chloride
SS: Stainless steel

EXAMPLE 1

One hundred and fifty fine tubes of glass, each 1.0 mm in inner diameter, 2.5 mm in outer diameter, 50 mm in length, were inserted through a square base plate of PC, 120×120×10 mm. The protrusion length of fine tubes from the base plate was 40 mm and the interval between adjacent tubes was 5 mm. Each fine tube was bonded to the base plate with an epoxy-type adhesive, "Araldite" (Trademark, produced by Ciba Geigy Co.). The base plate was attached to a holder made of PC, with a silicone rubber gasket placed therebetween, and firmly fixed by clamping with vises. The nozzle assembly, i.e. extruder, was immersed in a gently flowing coagulation bath containing 1% of sulfuric acid. The assembly was placed so that the discharged polymer latex may flow in the same direction as the flow direction of the coagulation solution. A polymer latex formed from 35 parts BD, 45 parts ST, and 20 parts AN was fed to the chamber (holder) and discharged from the fine tubes. Upon contact with the coagulation solution the discharged polymer latex coagulated into a coagulum in string form. The thus obtained slurry was sent to a solidification tank where the polymer particles were solidified by elevating the temperature to 93° C. The polymer particles were then dehydrated in a centrifugal dehydrator (at 600 G). The above operation was continued for 24 hours during which period the latex was steadily discharged and no clogging of the fine tube was observed. The resulting wet powder showed a moisture content of 17% (dry basis) and the dried powder showed a bulk density of 0.43, an average particle size of 0.92 mm and a fine powder content of 0.08% (−250 mesh, i.e., the powders which pass through a 250 mesh standard sieve). As compared with the powder material obtained in Comparative Example 1 (described later), the powder material obtained above was more easily dehydrated and showed a higher bulk density, a larger average particle size, and an extremely low fine powder content, indicating an excellent powder quality.

EXAMPLE 2

Sixty SS fine tubes, 0.8 mm in inner diameter, 1.2 mm in outer diameter, 30 mm in length, were fixedly arranged by means of a jig so that the interval between adjacent tubes may become 4 mm. An adjusted amount of MMA syrup was poured into the jig and polymerized by heating to form a base plate in the form of disc, 80 mm in diameter and 5 mm in thickness. In the resulting structure, the fine tubes had been firmly held by direct bonding and protruded from the base plate by 25 mm. This structure was then attached to a holder in the form as shown in FIGS. 1 and 2, with an O-ring of neoprene rubber placed therebetween, and firmly fixed by means of bolts and nuts to construct an extruder. In a manner similar to that in Example 1, the extruder was immersed and installed in a gently flowing coagulation bath containing 0.3% of sulfuric acid. A polymer latex formed from 40 parts BD, 20 parts MMA, and 40 parts ST was fed to the chamber of the extruder and discharged from the fine tubes. The discharged polymer latex coagulated in the form of string. The thus obtained slurry was solidified and centrifugally dehydrated in the same manner as in Example 1, except that the polymer particles were solidified at 85° C. The above operation was continued for a period of 24 hours, during which period the latex was steadily discharged and no clogging of the fine tubes was observed. The resulting wet powder showed a moisture content of 15.5% (dry basis) and the dried powder showed a bulk density of 0.46, an average particle size of 0.71 mm, and a fine powder content was 0.04% (−250 mesh, standard sieve).

EXAMPLE 3

The bottom wall, 95 mm in diameter, of a bottle-like article, shown in FIG. 3, molded from PVC was used as the base plate, through which were drilled 90 holes, 3.0 mm in diameter and 2 mm mutually apart. A fine tube, 1.5 mm in inner diameter, 3.0 mm in outer diameter, 90 mm in length, was inserted through each hole. After adjusting the length of protrusion of the fine tubes to 10 mm, each tube was bonded to the base plate with an epoxy-type adhesive, "Araldite" (Trademark, produced by Ciba Geigy Co.) to construct an extruder, the sectional view of which was as shown in FIG. 3. In a manner similar to that in Example 1, the extruder was immersed and installed in a gently flowing coagulation bath containing 0.8% aluminum sulfate. A polymer latex formed from 50 parts BA, 15 parts AN and 35 parts ST was fed to the chamber of the extruder and discharged from the fine tubes. The discharged polymer latex coagulated in the form of string. The thus obtained slurry was solidified and centrifugally dehydrated in the same manner as in Example 1, except that the polymer particles were solidified at 95° C. The above operation was continued for a period of 50 hours, during which period the latex was steadily discharged and no clogging of the fine tubes was observed. The resulting wet powder showed a moisture content of 21% (on dry basis) and the dried powder showed a bulk density of 0.45, an average particle size of 1.54 mm, and a fine particle content of 0.03% (−250 mesh, standard sieve).

COMPARATIVE EXAMPLE 1

Twenty liters of the same latex as used in Example 1 was poured into 30 liters of stirred 1-% aqueous sulfuric acid placed in a 80-liter vessel to coagulate the latex into a slurry (such a procedure is a conventional coagulation procedure which has been prevalently used). The resulting slurry was heated to 93° C. to solidify the polymer particles and was dehydrated in a centrifugal dehydrator (600 G). The resulting wet powder showed a moisture content of 33% (dry basis) and the dried powder showed a bulk density of 0.32, an average particle size of 0.25 mm, and a fine powder content of 2.03% (−250 mesh, standard sieve).

COMPARATIVE EXAMPLE 2

Ninety narrow holes of 1 mm in diameter were drilled through a PMMA base plate in the form of disc of 30 mm in thickness, the distance between the center lines of adjacent holes being 3 mm. The base plate was then jointed to a holder with an O-ring of neoprene rubber placed therebetween. The resulting extruder was immersed and installed in a coagulation bath, as in Example 1, and an experiment on the coagulation of a polymer latex was run under the same conditions as in Example 1. After 13 seconds from the beginning of the experiment, the formation of a coarse aggregate was noticed and thenceforth the coarse aggregate was formed continually one after another. After one minute from the beginning most of the narrow holes were blocked up. Upon visual inspection it was found that the formation of coarse aggregates was caused by the accumulation of discharged polymer latex in the eddy region of flow beyond extruder.

COMPARATIVE EXAMPLE 3

An experiment on the coagulation was run under the same conditions as in Example 2, using the same extruder as used in Example 2, except that the interval between the adjacent fine tubes was 0.5 mm. The discharge proceeded unsteadily and after 1.5 minutes from the start there was noticed the formation of a coarse aggregate formed by the merging of several coagular in string form. After about 5 minutes from the start, all string-form coagular began to merge and it was impossible to obtain a particulate material excellent in powder characteristics. It was evident that the above phenomenon was caused by the insufficient interval between adjacent fine tubes.

EXAMPLE 4

A base plate of PMMA in the form of disc, 6 mm in thickness and 150 mm in diameter, was divided into three equal sections with a mutual space of 15 mm between adjacent sections. In each section, 100 fine glass tubes, 0.8 mm in inner diameter, 2.0 mm in outer diameter, 60 mm in length, were inserted through the base plate, the distance between adjacent tubes being 5 mm and the length of protrusion being 54 mm (thus, the total number of fine tubes inserted through the base plate was 300). Each fine tube was bonded to the base plate with an epoxy adhesive, "Araldite" (Trademark, produced by Ciba Geigy Co.). The base plate was jointed to a funnel-like holder of glass, with a gasket placed therebetween, to construct an extruder resembling that shown in FIGS. 4 and 5. After having been connected to a polymer latex feed pipe, the extruder was immersed in a gently flowing coagulation bath containing 1% of sulfuric acid. The position of the extruder was adjusted so that the discharged polymer latex may flow in the same direction as the flow direction of the coagulation solution. A polymer latex formed from 35 parts BD, 45 parts ST, and 20 parts AN was fed to the chamber of the extruder and discharged from the fine tubes into the coagulation bath. Upon contact with the coagulation solution the discharged polymer latex coagulated into a coagulum in string form. The thus obtained slurry was sent to a solidification tank where the polymer particles were solidified by elevating the temperature to 93° C. The polymer particles were then dehydrated in a centrifugal dehydrator (600 G). The above operation was continued for 50 hours, during which period the latex was steadily discharged and no clogging of the fine tube was noticed. The resulting wet powder showed a moisture content of 16.8% (dry basis) and the dried powder showed a bulk density of 0.44, an average particle size of 0.82 mm, and a fine powder content of 0.07% (−250 mesh, standard sieve). As compared with the powder obtained in Comparative Example 1, the powder obtained above was more easily dehydrated and showed a higher bulk density, a larger average particle size, and an extremely low fine powder content, indicative of an ideal powder material.

EXAMPLE 5

A circular jig divided into 6 sectors (i.e. 6 fan-like sections, each having a vertical angle of 60°) with a mutual clearance of 20 mm between adjacent sectors was used to fix fine tubes, while the mutual distance between adjacent tubes is 4 mm. One hundred fine SS tubes (each 1.2 mm in outer diameter, 0.8 mm in inner diameter, and 50 mm in length) were fixed in each sector. An adjusted amount of a MMA syrup was poured into the jig and heated to polymerize MMA. There was obtained a base plate of PMMA in the form of disc, 5 mm in thickness, which held a total of 600 fine tubes directly bonded to the plate and distributed in 6 sectors, the length of protrusion of fine tubes from the base plate being 45 mm. The base plate was jointed to a funnel-like holder of PMMA, with a neoprene rubber gasket placed therebetween, to construct an extruder resembling that shown in FIGS. 4 and 5.

After having been connected to a polymer latex feed pipe, the extruder was immersed in a gently flowing coagulation bath containing 0.3% of sulfuric acid. The position of the extruder was adjusted so that the discharged polymer latex may flow in the same direction as the flow direction of the coagulation solution, as in Example 4. A polymer latex formed from 50 parts BD, 15 parts MMA, and 40 parts ST was fed to the chamber of the extruder and discharged from the fine tubes into the coagulation bath. Upon contact with the coagulation solution the discharged polymer latex coagulated into a coagulum in string form. The thus obtained slurry was sent to a solidification tank where the polymer particles were solidified by elevating the temperature to 84° C. The polymer particles were then dehydrated in a centrifugal dehydrator (600 G).

The above operation was continued for 60 hours, during which period the latex was steadily discharged and no clogging of the fine tube was noticed. The resulting wet powder showed a moisture content of 16.0% (dry basis) and the dried powder showed a bulk density of 0.44, an average particle size of 0.68 mm, and a fine powder content of 0.01% (−250 mesh, standard sieve).

EXAMPLE 6

A total of 600 fine glass tubes, each 2.5 mm in outer diameter, 1.0 mm in inner diameter, 50 mm in length, were inserted through a PMMA base plate in the disc form, 200 mm in diameter and 5 mm in thickness, having a through-hole of 60 mm in inner diameter drilled at the central part, the distance between adjacent fine tubes being 3 mm. Each fine tube was bonded to the base plate with an epoxy adhesive, "Araldite" (Trademark, produced by Ciba Geigy Co.), the length of protrusion of fine tubes from the base plate being 45 mm. The base plate was jointed to a holder of PMMA shown in FIGS. 6 and 7, with a silicone rubber gasket placed therebetween, to construct an extruder as shown in FIGS. 6 and 7. After having been connected to a polymer latex feed pipe, the extruder was immersed in a gently flowing coagulation bath containing 1% of sulfuric acid. The position of the extruder was adjusted so that the discharged polymer latex may flow in the same direction as the flow direction of the coagulation solution. A polymer latex formed from 35 parts BD, 45 parts ST, and 20 parts AN was fed to the chamber of the extruder and discharged from the fine tubes into the coagulation bath. Upon contact with the coagulation solution flowing through the central hole and along the outer surface of the fine tubes, the discharged polymer latex coagulated into a coagulum in string form. The thus obtained slurry was sent to a solidification tank where the polymer particles were solidified by elevating the temperature to 93° C. The polymer particles were then dehydrated in a centrifugal dehydrator (600 G). The resulting wet powder showed a moisture content of 14.7% (on dry basis).

The above operation was continued for 72 hours, during which period the latex was steadily discharged and no clogging of the fine tubes was noticed. The dried powder showed a bulk density of 0.46, an average particle size of 0.97 mm, and a fine powder content of 0.02% (−250 mesh, standard sieve). As compared with the powder material obtained in Comparative Example 1, the powder obtained above was more easily dehydrated and showed a higher bulk density, a larger average particle size, and an extremely low fine powder content, indicative of an ideal powder material.

EXAMPLE 7

Fine tubes of PMMA, each 2 mm in outer diameter, 0.8 mm in inner diameter, 50 mm in length, were inserted through a base plate of PMMA in disc form, 200 mm in diameter, 6 mm in thickness, so that the distance between adjacent fine tubes may become 4 mm. Further, for the purpose of feeding a coagulation solution, a SS pipe, 25 mm in outer diameter and 20 mm in inner diameter, was fixed to the assembly to construct an extruder shown in FIGS. 8 and 9. After having been connected to a polymer latex feed pipe, the extruder was immersed in a gently flowing coagulation solution containing 0.4% of sulfuric acid. The position of the extruder was adjusted so that the discharged polymer latex may flow in the same flow direction of the coagulation solution. A portion of the coagulation solution was withdrawn and sent through a pump to the coagulation solution feed pipe attached to the extruder to allow the solution to flow at a rate of 7 liters per minute. A polymer latex formed from 50 parts BD, 15 parts MMA, and 40 parts ST was fed to the extruder and discharged from the fine tubes into the coagulation solution. The discharged polymer latex came in satisfactory contact with that portion of coagulation solution supplied from the feed pipe attached to the extruder and another portion flowing outside the extruder and coagulated into a coagulum in string form. The thus obtained slurry was sent to a solidification tank where polymer particles were solidified by elevating the temperature to 84° C. The polymer particles were then dehydrated in a centrifugal dehydrator (600 G).

The above operation was continued for a period of 80 hours, during which period the polymer latex was steadily discharged and no clogging of the fine tubes was noticed. The resulting wet powder showed a moisture content of 16.2% (dry basis) and the dried powder showed a bulk density of 0.46, an average particle size of 0.86 mm, and a fine powder content of 0.01% or less (−250 mesh, standard sieve).

EXAMPLE 8

Fine tubes of glass, each 2 mm in outer diameter, 0.5 mm in inner diameter and 30 mm in length, were inserted through a base plate of PC in disc form, 250 mm in diameter and 5 mm in thickness, so that the clearance between adjacent tubes may become 4 mm. Further, for the purpose of feeding a coagulation solution, a SS pipe, 60 mm in caliber, was fixed to the assembly to construct an extruder as shown in FIGS. 8 and 9. After having been connected to a polymer latex feed pipe, the extruder was immersed in a coagulation solution (aqueous sulfuric acid of pH 1.2) gently flowing in a coagulation tank. The position of the extruder was adjusted so that the discharged polymer latex may flow in the same direction as the flow direction of the coagulation solution. A portion of the coagulation solution was withdrawn and sent through a pump to the coagulation solution feed pipe attached to the extruder and delivered from said pipe at a rate of 10 liters per minute. A polymer latex formed from 50 parts BD, 32 parts ST, and 18 parts AN was fed to the extruder and discharged from the fine tubes into the coagulation solution. The discharged polymer latex came in satisfactory contact with that portion of coagulation solution delivered from the feed pipe attached to the extruder and another portion flowing outside the extruder and coagulated into a coagulum in string form. The thus obtained slurry was sent to a solidification tank where polymer particles were solidified by elevating the temperature to 91° C. The polymer particles were then dehydrated in a centrifugal dehydrator (600 G).

The above operation was continued for a period of 50 hours, during which period the polymer latex was steadily discharged without noticeable clogging of the fine tubes. The resulting wet powder showed a moisture content of 21.3% (dry basis) and the dried powder showed a bulk density of 0.41, an average particle size of 0.43 mm, and a fine powder content of 0.08% (−250 mesh, standard sieve).

EXAMPLE 9

A total of 1649 fine tubes of PC, each 1.8 mm in outer diameter, 0.7 mm in inner diameter and 35 mm in length, were inserted through a rectangular base plate of PC, 5 mm in thickness, 100 mm in width and 500 mm in length, so that the clearance between adjacent fine tubes may become 3 mm. Each fine tube was bonded to the base plate with an epoxy adhesive, "Epikon" (Trademark, produced by Dainippon Ink and Chemicals, Inc.). The base plate was then jointed to a holder of PC, with a silicone rubber gasket placed therebetween, to construct an extruder as shown in FIG. 10. The length of protrusion of fine tubes from the base plate was 30 mm and the length of minor axis of the base plate was 100 mm. After having been connected to the polymer latex feed pipe, the extruder was immersed in a coagulation solution (1.0%-aqueous sulfuric acid) gently flowing in a coagulation tank. The position of the extruder was adjusted so that the discharged polymer latex may flow in the same direction as the flow direction of the coagulation solution and the longer edge of the base plate may be horizontally positioned. A polymer latex formed from 21 parts AN, 30 parts BD, 49 parts ST, and 170 parts water was fed to the extruder and discharged from the fine tubes into the coagulation solution. The discharged polymer latex came into satisfactory contact with the coagulation solution and coagulated in the form of string, resulting in a polymer slurry. Since the polymer particles at this stage were in a state of soft aggregate of low mechanical strength, the resulting slurry was sent continuously to a solidification tank where the polymer particles were solidified by the elevation of temperature to 93° C. The slurry from the solidification tank was dehydrated in a centrifugal dehydrator (operating at 600 G) to yield a wet powder of 16.8% (dry basis) in water content.

The above operation was continued for a period of 18 hours, during which period the coagulation proceeded smoothly, both the discharge of polymer latex and the flow of coagulation solution being steady without noticeable clogging of the fine tubes. After thorough drying, the powder product was tested for the powder characteristics. The test showed that the bulk density was 0.43, the average particle size 0.60 mm, and the fine powder content 0.26% (−250 mesh, standard sieve). As compared with the powder material obtained in Comparative Example 1, the powder product obtained above was more easily dehydrated and showed a higher bulk density, a larger average particle size, and an extremely low fine powder content, indicative of an ideal powder material.

EXAMPLE 10

A total of 900 fine tubes of SS, each 1.06 mm in outer diameter, 0.7 mm in inner diameter, and 40 mm in length, were inserted through an elliptic base plate of SS, 2 mm in thickness, 150 mm in length of minor axis, and 300 mm in length of major axis. Each fine tube was jointed to the base plate by soldering. The base plate was then jointed to a holder of SS through an O-ring of neoprene rubber placed therebetween to construct an extruder, the clearance between adjacent fine tubes being about 4 mm and the length of protrusion from the base plate 38 mm. After having been connect to a polymer latex feed pipe, the extruder was immersed in a coagulation solution (0.3% aqueous sulfuric acid) gently flowing in a coagulation tank in a manner such that the discharged polymer latex will flow in the same direction as the flow direction of the coagulation solution and the major axis of the base plate may be held upright. A polymer latex formed from 10 parts MMA, 20 parts ST, 70 parts BD, and 200 parts water, and discharged from the fine tubes into the coagulation solution. The discharged polymer latex came into satisfactory contact with the coagulation solution and coagulated in the form of string, resulting in a polymer slurry. The slurry was continuously sent to a solidification tank where the polymer particles were solidified by the elevation of temperature to 82° C. The slurry from the solidification tank was dehydrated in a centrifugal dehydrator operating at 600 G to yield a wet powder of 15.2% (on dry basis) in water content.

The above operation was continued for a period of 24 hours, during which period the coagulation proceeded smoothly, both the extrusion of polymer latex and the flow of coagulation solution being steady without noticeable clogging of the fine tubes. After thorough drying, the powder product was tested for powder characteristics. It was found that the bulk density was 0.41, the average particle size 0.74 mm, and the fine powder content 0.05% (−250 mesh, standard sieve).

EXAMPLE 11

A total of 517 fine tubes of PMMA, each 4.0 in outer diameter, 0.5 mm in inner diameter, and 10 mm in length, were inserted through a base plate of PMMA, 5 mm in thickness, 80 mm in width, and 300 mm in length, in a manner such that the clearance between adjacent fine tubes is 3 mm. After bonding each fine tube to the base plate by use of a solvent, the base plate was attached to a holder of PMMA through a gasket of silicone rubber, as shown in FIG. 10 to construct an extruder. The length of protrusion of fine tubes from the base plate was 5 mm and the length of minor axis of the base plate was 80 mm. After having been connected to a polymer latex feed pipe, the extruder was immersed in a coagulation solution (0.5% aqueous magnesium sulfate) flowing gently in a coagulation tank. The position of the extruder was adjusted so that the direction of extrusion of the polymer latex may be the same as the flow direction of the coagulation solution and the longer edge of the base plate may be held upright. A polymer latex formed from 50 parts MMA, 30 parts BA, 20 parts EA, and 160 parts water was introduced into the extruder to cause discharging of the latex from the fine tubes into the coagulation solution. The discharged polymer latex came into satisfactory contact with the coagulation solution and coagulated in string form to yield a slurry. The resulting slurry was continuously sent to a solidification tank where the polymer particles were soldified by heating to 88° C. The slurry was then dehydrated in a centrifugal dehydrator (600 G) to yield a wet powder of 20.9% (dry basis) in water content.

The above operation was continued for a period of 48 hours, during which period the coagulation proceeded smoothly, both the discharge of polymer latex and the flow of coagulation solution being steady without noticeable clogging of the fine tubes. After thorough washing, the powder material was tested for the powder characteristics. It was found that the bulk density was 0.48, the average particle size was 1.71 mm, and the fine powder content was 0.51% (−250 mesh, standard sieve).

COMPARATIVE EXAMPLE 4

A total of 1457 fine tubes of PVC, each 2.0 mm in outer diameter, 0.5 mm in inner diameter and 70 mm in length were inserted through a rectangular base plate of PVC, 6 mm in thickness, 170 mm in width, and 250 mm in length. Each fine tube was bonded to the base plate with an epoxy adhesive, "Epikon" (Trademark, produced by Dainippon Ink and Chemicals Inc.). The base plate was then jointed to a holder of PVC through a silicone rubber gasket, as shown in FIG. 10, to construct an extruder. Using the same procedure, coagulation solution, and polymer latex as used in Example 9, the operation of coagulation was started. After about 8 minutes from the start, the formation of a coarse coagulum was noticed and thenceforth the coarse coagulum appeared one after another until the operation was discontinued after 20 minutes from the start. Upon visual inspection it was found that the reason was unsatisfactory supply of the coagulation solution to the central part of the extruder.

EXAMPLE 12

A total of 100 fine tubes of PMMA, each 2 mm in outer diameter, 1 mm in inner diameter, and 50 mm in length, were inserted through a base plate of PMMA, 6 mm in thickness and 150 mm in diameter, so that the fine tubes may be uniformly spaced. Each fine tube was bonded to the base plate with an epoxy adhesive, "Epikon" (Trademark, produced by Dainippon Ink and Chemicals, Inc.). A coagulation solution feeder provided with a delivery pipe, 4 mm in caliber and 4 mm in length, was fabricated from PMMA. The above base plate, coagulation solution feeder, and a funnel-like holder of PMMA were assembled into an extruder as shown in FIG. 11 by employing silicone rubber gaskets. In this extruder, the distal end of each fine tube and the coagulation solution outlet were in the same plane.

The extruder was installed in a coagulation tank in which a coagulation solution (1% aqueous sulfuric acid) was gently flowing. A polymer latex (38% solids content) prepared from 35 parts BD, 19 parts AN, and 46 parts ST was fed to the holder at a rate of 2 liters/minute and at the same time a coagulation solution (1% aqueous sulfuric acid) was fed to the coagulation solution feeder. The latex was ejected from the fine tubes and the coagulation solution was ejected from the annular orifices of the coagulation solution feeder. Upon mutual contact of the latex and the coagulation solution there was formed a coagulum in the form of string of beads (rosary). The resulting slurry was sent to a solidification tank where the polymer was heated to 92° C. The solidified polymer particles were withdrawn and dehydrated in a centrifugal dehydrator (600 G) to yield a wet powder containing 17.5% (dry basis) of water.

The above operation was continued for a period of 100 hours, during which period both the ejection of latex and that of coagulation solution were steady without noticeable clogging of delivery nozzles. After thorough drying of wet powder, the resulting dry powder showed a bulk density of 0.45, an average particle size of 0.95 mm, and a fine powder content of 0.11% (−250 mesh, standard sieve). As compared with the powder material obtained in Comparative Example 5 (described later), the powder material obtained above was dehydrated more easily and showed a higher bulk density, a larger average particle size, and an extremely low fine powder content, indicative of an ideal powder material.

EXAMPLE 13

Use was made of an extruder of the same structure as that used in Example 12, except that the fine tubes were 15 mm in length. The extruder, wherein the fine tubes were protruded by 20 mm from the coagulation solution outlet, was installed in a coagulation tank, in which a coagulation solution (0.2% aqueous aluminum sulfate solution) was gently flowing. A polymer latex (40% solids content) prepared from 50 parts BD, 20 parts MMA, and 30 parts ST was fed at a rate of 2 liters/minute to the holder and, at the same time, a coagulation solution (0.2% aqueous aluminum sulfate solution) was fed at a rate of 3 liters/minute to the coagulation solution feeder. The polymer latex satisfactorily coagulated into a coagulum in the form of string of beads (rosary). The resulting slurry was sent to a solidification tank and heated to 85° C. to solidify. The solidified polymer particles were dehydrated in a centrifugal dehydrator (at 600 G) to yield a wet powder containing 16.2% (dry basis) of water.

The above operation was continued for a period of 64 hours, during which period both the ejection of latex and that of coagulation solution were steady without noticeable clogging of the extruder. After thorough drying of wet powder, the resulting dry powder showed a bulk density of 0.45, an average particle size of 1.06 mm, and a fine powder content of 0.03% (−250 mesh, standard sieve).

COMPARATIVE EXAMPLE 5

Twenty liters of the same latex as used in Example 1 was poured into 30 liters of stirred 1% aqueous sulfuric acid placed in a 80 liter vessel to coagulate the latex into a slurry (such a procedure is a conventional coagulation procedure which has been prevalently used). The resulting slurry was heated to 93° C. to soldify the polymer particles and was dehydrated in a centrifugal dehydrator (600 G). The resulting wet powder showed a moisture content of 34% (dry basis) and the dried powder showed a bulk density of 0.32, an average particle size of 0.26 mm, and a fine powder content of 2.12% (−250 mesh, standard sieve).

We claim:

1. An extrusion nozzle assembly for coagulating a polymer latex, said assembly comprising:
   (a) a base plate;
   (b) fine tubes which satisfy simultaneously the following conditions (i)–(iii):
      (i) said fine tubes have a circular section inner diameter D which is constant over the entirety of a length L of the fine tubes and not less than 0.5 mm,
      (ii) a ratio L/D of the fine tubes is 5–200, and
      (iii) said fine tubes have a circular section outer diameter which is constant over the entirety of said length L; and
   (c) a holder,
   wherein said base plate, said fine tubes and said holder are constructed so that said fine tubes are fixed to the base plate in such a manner that said fine tubes are mutually spaced by at least 3 mm and no more than 10 mm, the fine tubes protrude from the base plate in a direction opposite said holder by at least 10 mm, and the base plate and the holder define a chamber portion for distribution of the polymer latex to the fine tubes at a uniform pressure.

2. The extrusion nozzle assembly for coagulating a polymer latex according to claim 1 wherein the outer diameter of the fine tubes is no more than 5 mm.

3. The extrusion nozzle assembly according to claim 1 wherein surfaces of said base plate are each divided into at least two sections, said sections being mutually spaced by an interval of at least 5 mm, said fine tubes extending from said base plate only at said sections.

4. The extrusion nozzle assembly according to claim 1 wherein said fine tubes extend only from a peripheral portion of said base plate and said base plate includes a central opening for a coagulation solution.

5. The extrusion nozzle assembly according to claim 1 wherein a conduit through which a coagulation solution is fed to a central portion of a front side of said base plate is provided and said fine tubes extend from said base plate only at positions other than that of said conduit.

6. The extrusion nozzle assembly according to claim 1 wherein said fine tubes protrude from said base plate by at least 10 mm.

7. The extrusion nozzle assembly according to claim 1 wherein said base plate and fine tubes are bonded by an adhesive.

8. The extrusion nozzle assembly according to claim 1 wherein said base plate and fine tubes are bonded by one piece molding.

9. The extrusion nozzle assembly according to claim 1 wherein said base plate and fine tubes are bonded by polymerization reactions.

10. The extrusion nozzle assembly according to claim 1 wherein said base plate and fine tubes are bonded by cooling and solidifying a molten material which forms the base plate.

11. The extrusion nozzle assembly for coagulating a polymer latex according to claim 1 wherein the inner diameter of the fine tubes is no more than 3 mm.

12. The extrusion nozzle assembly for coagulating a polymer latex according to claim 11 wherein the outer diameter of the fine tubes is no more than 5 mm.

13. The extrusion nozzle assembly according to claim 1 wherein said base plate has a minor axis not exceeding 150 mm.

14. The extrusion nozzle assembly according to claim 13 wherein said base plate is rectangular.

* * * * *